(12) United States Patent
Barbarossa et al.

(10) Patent No.: US 6,539,149 B1
(45) Date of Patent: Mar. 25, 2003

(54) WAVEGUIDE GRATING ROUTER EMPLOYING TRANSMISSIVE ECHELLE GRATINGS

(75) Inventors: Giovanni Barbarossa, Tucker; Leonard George Cohen, Atlanta; Yuan P. Li, Duluth; Yan Wang, Norcross, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/399,575

(22) Filed: Sep. 20, 1999

Related U.S. Application Data

(60) Provisional application No. 60/148,028, filed on Aug. 10, 1999.

(51) Int. Cl.[7] .................................................. G02B 6/34
(52) U.S. Cl. .............................................. 385/37; 359/571
(58) Field of Search .............................. 385/15, 24, 37, 385/47; 359/571

(56) References Cited

U.S. PATENT DOCUMENTS 3,845,294 A * 10/1974 Indig et al. ................. 250/199
5,080,465 A * 1/1992 Laude ......................... 359/571
5,966,483 A * 10/1999 Chowdhury ................. 385/37

OTHER PUBLICATIONS

Monolithic integrated wavelength demultiplexer based on a waveguide Rowland circle grating in InGaAsP/InP; Jian-Jun He et al.; Lightwave Technology, Journal of, vol.: 16 Issue:4, Apr. 1998 pp. 631–638.*
Echelle Grating Spectrometer Integrated With Curved Output Waveguides; Fallahi, M. et al.; Broadband Analog and Digital Optoelectronis,Multiple Acess Networks, Integrated Optoelectronics, Smart Pixels, Summer Topical Meeting Digest on; B9–B10; Jul.–Aug. 92.*

* cited by examiner

Primary Examiner—Rodney Bovernick
Assistant Examiner—Sarah U Song
(74) Attorney, Agent, or Firm—Lowenstein Sandler PC

(57) ABSTRACT

In accordance with the invention, an optical router for an optical communications system comprises a pair of transmissive Echelle gratings having their grating surfaces coupled by a waveguide grating. The arrangement provides for substantial design freedom in that the dispersive parameters include the shapes of the first and second Echelle gratings as well as the path length difference among the waveguides. Moreover the device eliminates any need for reflective surfaces in the Echelle gratings.

7 Claims, 2 Drawing Sheets

WAVEGUIDE GRATING ROUTER EMPLOYING TRANSMISSIVE ECHELLE GRATINGS

CROSS REFERENCE TO RELATED APPLICATIONS

This application claims the benefit of U.S. Provisional Application Ser. No. 60/148,028 of identical title filed by the present inventors on Aug. 10, 1999.

FIELD OF THE INVENTION

This invention relates to optical fiber communication systems and, in particular, to a new type of waveguide router for multiplexing and demultiplexing wavelength division multiplexed (WDM) signal channels in such systems.

BACKGROUND OF THE INVENTION

Optical fiber communication systems are beginning to achieve their great potential for the rapid transmission of vast amounts of information. In essence, an optical fiber system comprises a light source, a modulator for impressing information on the light, an optical fiber transmission line for carrying the optical signals, and amplifiers for amplifying the signals along the transmission path. It also includes a receiver for detecting the signals and for demodulating the information they carry. Increasingly the optical signals are wavelength division multiplexed signals (WDM signals) comprising a plurality of distinct wavelength signal channels.

Optical routers are important components in WDM fiber communication systems. Such devices perform the function of multiplexing separately modulated different wavelength channels for transmission on a single transmission fiber. They also separate the transmitted signal into the plurality of constituent channels so that they can be separately demodulated at a receiver or be added, or dropped or rerouted at intermediate points along the transmission path.

Different optical router designs utilize different dispersive elements to separate or recombine different wavelength channels. One promising router design utilizes a diffraction grating comprising a plurality of different length waveguides. See, for example, U.S. Pat. No. 5,002,350 issued to C. Dragone on Mar. 26, 1991, which is incorporated herein by reference. A particularly advantageous design achieving low levels of crosstalk and insertion loss comprises a waveguide grating connecting a pair of star couplers. See U.S. Pat. No. 5,136,671 issued to C. Dragone on Aug. 4, 1992, which is incorporated herein by reference. In this device a multiplexed signal entering a first star coupler is dispersed by the waveguide grating and the different wavelength channels are presented at the second star coupler on different angularly spaced apart output ports. Conversely, different channels applied to the corresponding ports of the second star coupler are presented as a single multiplexed signal at the first star coupler.

A second type of optical router is based upon a reflective Echelle grating. In essence, this router is a waveguiding slab device comprising an input port directed toward a reflective grating formed along a concave arc. The grating disperses a signal from the input port and, because of its concave arc arrangement, reflects the separated channels back in the general direction of the input port where they can be taken out by angularly separated output ports. Conversely, signals inputted into the corresponding "output" ports will be combined and the multiplexed signal can be taken out the "input" port. The preferred arcs, referred to as Rowland circles or generalized Rowland circles, permit ease of input and ease of fabrication. Such devices are described in detail in R. Merz et al., "On the theory of planar spectrographs", *Journal of Lightwave Technology*, Vol. 10, No. 12, pp. 2017–22 (December 1992); and J. He et al., "Monolithic integrated wavelength demultiplexer based on a waveguide Rowland circle grating in InGaAsP/InP", *Journal of Lightwave Technology*, Vol. 16, No. 4, pp. 1–7 (April 1998). All three references are incorporated herein by reference.

A difficulty with these conventional devices is that they provide relatively little freedom in design. In the Dragone router, the dispersive power is provided solely by differences in waveguide length, and in the reflective Echelle grating devices, the shape of the device defines the dispersive power. Moreover, it is difficult to miniaturize high quality reflective surfaces needed for the grating.

Accordingly there is a need for a WDM optical communication system with a new optical router providing enhanced freedom of design without the use of miniature reflective surfaces.

SUMMARY OF THE INVENTION

In accordance with the invention, an optical router for an optical communications system comprises a pair of transmissive Echelle gratings having their grating surfaces coupled by a waveguide grating. The arrangement provides for substantial design freedom in that the dispersive parameters include the shapes of the first and second Echelle gratings as well as the path length difference among the waveguides. Moreover the device eliminates any need for reflective surfaces in the Echelle gratings.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
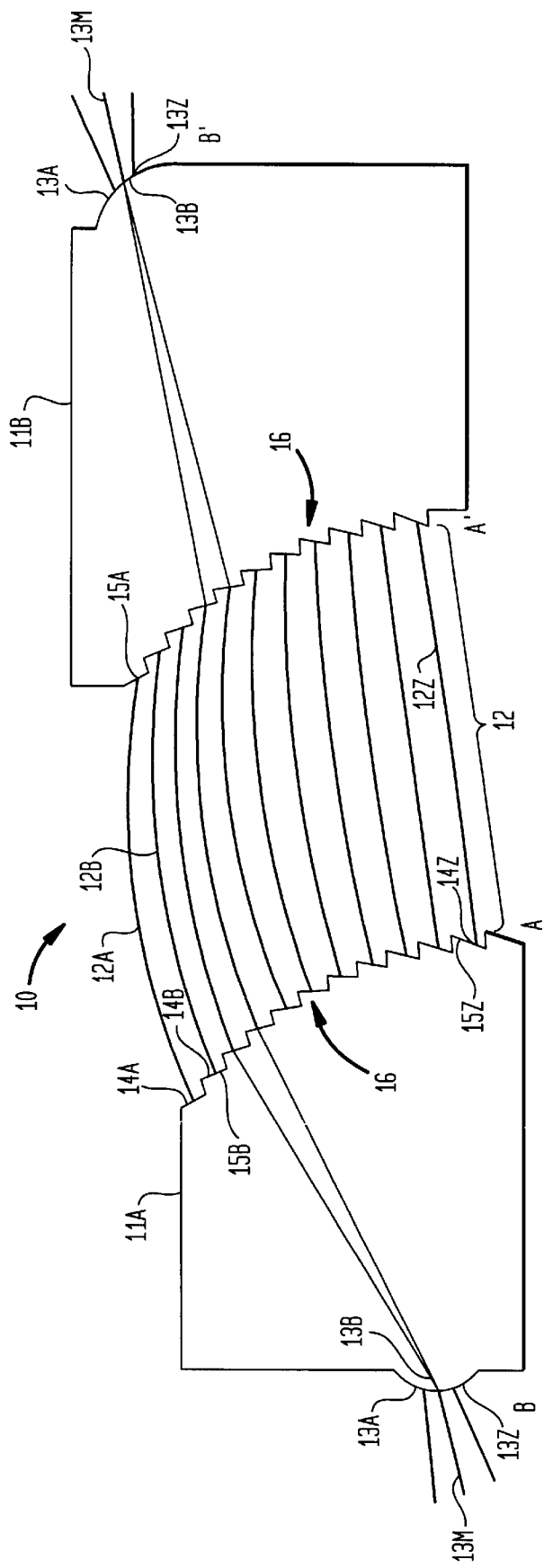
FIG. 1 is a schematic diagram of an optical router.

Referring to the drawing, FIG. 1 schematically illustrates a router 10 comprising a pair of transmissive Echelle gratings 11A and 11B coupled together by a waveguide grating 12 comprising a plurality of different length waveguides 12A, 12B, . . . , 12Z.

Each transmissive Echelle grating can be a waveguide slab device comprising a first array of waveguide ports 13A–13Z including a primary port, e.g. 13M and a second array of waveguide ports 14A–14Z coupled to the waveguides 12A–12Z. The waveguide ports 14A–14Z are advantageously disposed on serrated edges 15A–15Z arranged along an arc 16 that is concave in relation to the primary port 13M. Preferably the arc 16 is in the form of a generalized Rowland circular arc so that the optical path length between port 13M and each successive port, 14A–14Z increments by a constant amount Δl. The path length increments can be different for Echelle gratings 11A and 11B, so if 11A is the input grating, we can designate its path length increment as $\Delta l_{in}$. We can then call 11B the output grating and designate its increment as $\Delta l_{out}$, where $\Delta l_{in}$ and $\Delta l_{out}$ can differ.

The waveguides 12A–12Z can also be advantageously fabricated so that the path length is a constant increment, e.g. $\Delta l_g$. The waveguides and the Echelle grating ports preferably interface via tapered coupling portions to minimize the generation of higher order modes.

Figure 2:
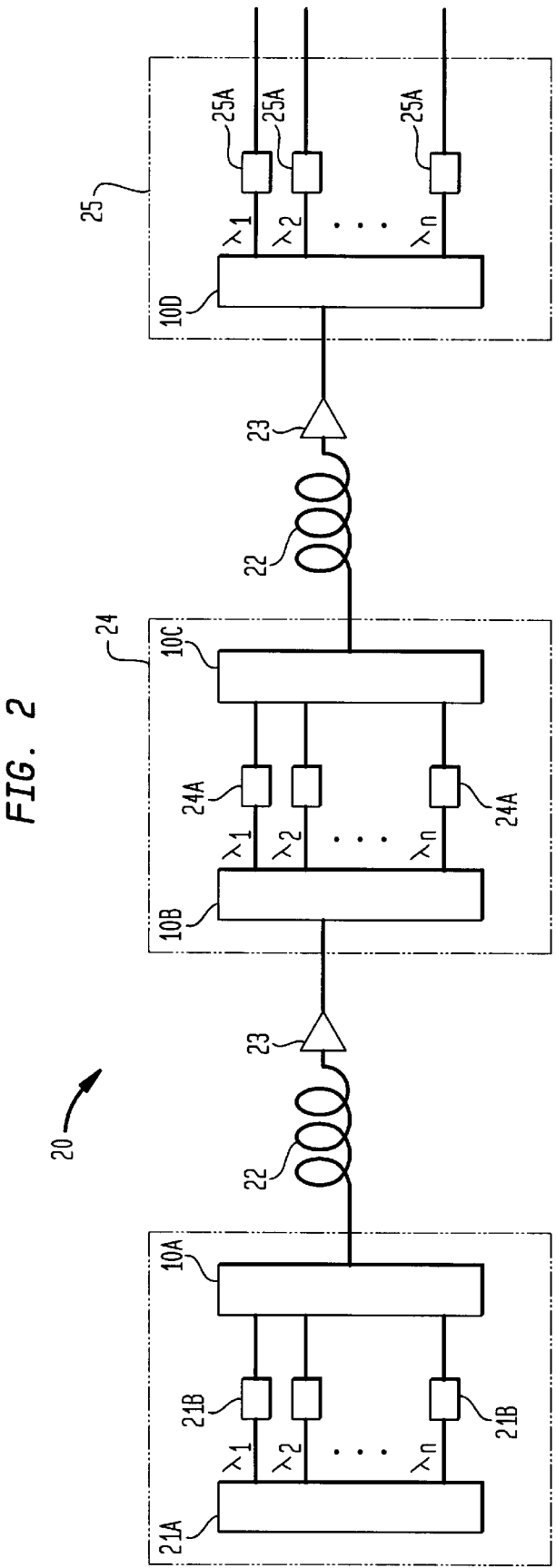
FIG. 2 is a schematic diagram of a WDM optical fiber communication system employing the router of FIG. 1.

FIG. 2 schematically illustrates preferred uses of the FIG. 1 router in a WDM optical fiber communication system 20. In essence, system 20 comprises a WDM transmitter 21, a transmission fiber 22, one or more rare earth doped optical amplifiers 23, one or more add/drop nodes 24, and a WDM receiver 25.

The WDM transmitter 21 typically comprises one or more sources 21A for providing a plurality of different wavelength light carriers, $\lambda_1, \lambda_2, \ldots, \lambda_n$ and one or more modulators 21B for separately modulating the respective channels. A router 10A in multiplexer orientation can be used to combine the modulated signals for transmission on fiber 22.

Each add/drop node 24 can comprise a first router 10B oriented as a demultiplexer for separating the transmitted signal into a plurality of wavelength distinct channels, $\lambda_1, \lambda_2, \ldots, \lambda_n$. Add/drop elements, 24A can be provided on one or more of the channels 26A–26Z to permit rerouting of a channel or dropping of a channel at its destination node and addition of a corresponding wavelength channel for further transmission from the node 24. The channels can be applied to a second router 10C oriented as a multiplexer and the signals are combined for continued transmission to another node (not shown) or receiver 25.

The WDM receiver 25 can comprise a router 10D in the demultiplexer orientation for receiving the transmitted signal and separating it into a plurality of separate channels. The separate channels are then demodulated in one or more demodulators 25A.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. An optical router for combining or separating different wavelength optical signals comprising:

first and second transmissive Echelle gratings, each Echelle grating comprising a waveguiding slab device including a primary port and an opposing array of waveguide ports disposed on serrated slab boundary edges arranged in an arc concave in relation to the primary port so that the optical path length between the primary port and each waveguide port is different; and a plurality of waveguides, each waveguide extending between a waveguide port of the first grating to a waveguide port of the second grating.

2. The router of claim 1 wherein the optical path length of each of the waveguides is different.

3. The router of claim 1 wherein for each grating, the optical path length between the primary port and successive waveguide ports differs by a constant increment.

4. The router of claim 1 wherein the optical path length between successive waveguides differs by a constant increment.

5. The router of claim 1 wherein the optical pathlengths between the primary port of and successive waveguide ports of said first grating differ by a first constant increment, the optical pathlengths between successive waveguides differ by a second constant increment; and the optical pathlengths between the primary port and successive waveguide ports of the second grating differ by a third constant increment.

6. The router of claim 5 wherein the first, second and third constant increments are different.

7. The router of claim 1 wherein said arc comprises the arc of a generalized Rowland circle.

* * * * *